United States Patent
Welch

[11] Patent Number: 5,540,537
[45] Date of Patent: Jul. 30, 1996

[54] PORTABLE HOIST

[76] Inventor: Wilmer M. Welch, 211 Alta Vista, Del Rio, Tex. 78840

[21] Appl. No.: 517,117

[22] Filed: Aug. 21, 1995

Related U.S. Application Data

[63] Continuation of Ser. No. 212,014, Mar. 11, 1994, abandoned.

[51] Int. Cl.$^6$ ........................................... B60R 9/06
[52] U.S. Cl. ........................... 414/462; 212/180; 224/521
[58] Field of Search ............................. 212/180; 224/321, 224/518, 519, 520, 521; 414/462, 563

[56] References Cited

U.S. PATENT DOCUMENTS

| | | | |
|---|---|---|---|
| 1,317,464 | 9/1919 | Todd | 212/180 |
| 2,630,334 | 3/1953 | Ewers . | |
| 2,867,402 | 1/1959 | Graybill et al. | 248/226 |
| 3,519,154 | 7/1970 | Riley | 414/462 |
| 4,226,331 | 10/1980 | Dumond | 212/258 |
| 4,381,069 | 4/1983 | Kreck | 224/42.44 |
| 4,397,607 | 8/1983 | Neill, Jr. et al. | 414/786 |
| 4,419,038 | 12/1983 | Pendergraft | 414/543 |
| 4,561,575 | 12/1985 | Jones | 414/462 X |
| 4,676,413 | 6/1987 | Began et al. | 224/521 X |
| 4,746,263 | 5/1988 | Cook | 414/543 |
| 4,806,063 | 2/1989 | York | 212/180 X |
| 4,881,864 | 11/1989 | Amato | 414/543 |
| 4,961,604 | 10/1990 | Kisner | 293/106 |
| 4,971,509 | 11/1990 | Sechovec et al. | 414/462 |
| 5,064,078 | 11/1991 | Van Staveren | 212/180 |
| 5,137,411 | 8/1992 | Eul et al. | 414/462 |
| 5,165,836 | 11/1992 | Shonka | 414/111 |
| 5,205,700 | 4/1993 | Lin et al. | 414/540 |
| 5,211,526 | 5/1993 | Robinette | 414/550 |
| 5,281,078 | 1/1994 | Mills, Jr. | 212/180 X |

*Primary Examiner*—Karen B. Merritt
*Assistant Examiner*—Janice L. Krizek
*Attorney, Agent, or Firm*—Donald R. Comuzzi; Christopher L. Makay

[57] ABSTRACT

A hoist which mounts to a trailer hitch drawbar of a vehicle includes a post connected to a tongue. The post includes an angle which defines a boom extending from a central column. The tongue includes a pivot member connected to a securing member which includes holes to allow the hoist to be secured to the trailer hitch drawbar. A brace connected between the boom and central column supports the boom, while a brace connected between the central column and the securing member supports the central column. The boom includes an eye utilized to support a block and tackle or, alternatively, a pulley utilized to support the cable of a winch mounted to the central column.

9 Claims, 1 Drawing Sheet

PORTABLE HOIST

BACKGROUND OF THE INVENTION

Cross-Reference to Related Applications

This application is a continuation of Application Ser. No. 08/212,014 filed on Mar. 11, 1994 and now abandoned.

FIELD OF THE INVENTION

The present invention relates to a hoist that mounts within a trailer hitch drawbar of a vehicle to provide a means for lifting objects which are then transported by the vehicle.

DESCRIPTION OF THE RELATED ART

The ability to use vehicles as a means for hauling objects as well as a means for transportation has always been a public concern. Consequently, various devices which mount to the rear of a vehicle to serve as a lift have been invented. One such device is disclosed in U.S. Pat. No. 2,867,402 issued on Jan. 6, 1959, to Graybill, et al. Graybill, et al. disclose an angled post with hooks at an upper end and a bumper clamp at the opposite end. The bumper clamp facilitates the mounting of the shaft to the rear bumper of a vehicle, while the hooks permit objects to be suspended for transportation by the vehicle.

U.S. Pat. No. 4,806,063 issued on Feb. 21, 1989, to York discloses a hoist which mounts to a ball trailer hitch. The hoist includes a multiple section boom which is provided with a winch. Straps attached to either side of a vehicle and a torsion bar mounted to the rear of the vehicle support the boom on the ball trailer hitch. The winch cable connects to a hanger which is used to support objects for transportation by the vehicle.

U.S. Pat. No. 5,064,078 issued on Nov. 12, 1991, to Van Staveren discloses a vehicle mounted crane. The crane includes a hydraulic cylinder to raise and lower its boom, and, further, mounts to a modified vehicle bumper using a specially designed support assembly. The distal end of the boom includes a chain which may connect to a variety of carrying devices such as a hook or an axle attachment towing device.

U.S. Pat. No. 4,881,864 issued Nov. 21, 1989, to Amato discloses a hoist which attaches to a trailer hitch drawbar of a vehicle. The hoist includes a post connected to a tongue which fits within the trailer hitch drawbar to support the post. The lower end of the post includes an adjustable foot which aids in supporting the post. The post includes a boom which supports a cable driven by a winch attached to the post. The cable connects to a hook which is utilized to connect the cable to objects for hauling using the vehicle.

U.S. Pat. No. 5,211,526 issued on May 18, 1993, to Robinette discloses a mobile crane. The crane includes a central column which connects at a lower end to a T-shaped support and at its upper end to a boom. The T-shaped support fits within a trailer hitch drawbar to secure the crane to the rear of a vehicle. The crane further includes a hydraulic cylinder which vertically manipulates the boom.

Although the above-described devices operate adequately to lift objects for hauling, they each suffer from the disadvantage of difficult installation. For example, U.S. Pat. No. 2,867,402 uses a complicated clamping system to attach its post to the bumper of a vehicle, while U.S. Pat. No. 5,064,078 requires both a modified bumper and specially designed support assembly to mount its crane. Furthermore, both U.S. Pat. Nos. 4,806,063 and 5,211,526 require complicated and time-consuming assembly. Finally, U.S. Pat. No. 4,881,864 is difficult to mount into a trailer hitch drawbar because it is a single unit whose weight requires strenuous exertion from a user in order to lift it and place it within the trailer hitch drawbar.

Accordingly, a hoist that requires little assembly and is extremely simple to mount to the rear of a vehicle is highly desirable.

SUMMARY OF THE INVENTION

In accordance with the present invention, a hoist which mounts to a trailer hitch drawbar of a vehicle includes a post connected to a tongue. The post includes an angle which defines a boom extending from a central column. The tongue includes a pivot member of substantially cylindrical shape connected to a securing member of substantially rectangular shape which includes holes to allow the hoist to be fastened to the trailer hitch drawbar. A brace connected between the boom and the central column supports the boom, while a brace connected between the central column and the securing member supports the central column. The boom includes an eye utilized to support a block and tackle or, alternatively, a pulley utilized to support the cable of a winch mounted to the central column.

The pivot member allows the easy mounting of the hoist to a trailer hitch drawbar. To connect the hoist, it is laid on the ground so that the pivot member may be inserted into the trailer hitch drawbar. Once the pivot member is inserted, the post is rotated to an upright position, and the securing member inserted into the trailer hitch drawbar until one of its holes lines up with a hole in the trailer hitch drawbar. After the holes are aligned, a pin is inserted to secure the hoist within the trailer hitch drawbar. At this point, either the winch or the block and tackle may be utilized to lift an object so that the vehicle may transport it. Accordingly, the pivot member allows easy attachment of the hoist within a trailer hitch drawbar because it supports the weight of the hoist during the raising of the post to its upright position and, further, supports the hoist during the insertion of the square member.

It is, therefore, an object of the present invention to provide a hoist which includes a pivot member which permits the easy mounting of the hoist within a trailer hitch drawbar.

It is another object of the present invention to provide a hoist which is constructed as a single integral unit.

It is a further object of the present invention to provide a hoist with either a winch or a block and tackle.

Still other objects, features, and advantages of the present invention will become apparent to those skilled in the art in light of the following.

DETAILED DESCRIPTION OF THE PREFERRED EMBODIMENT

Figure 1:
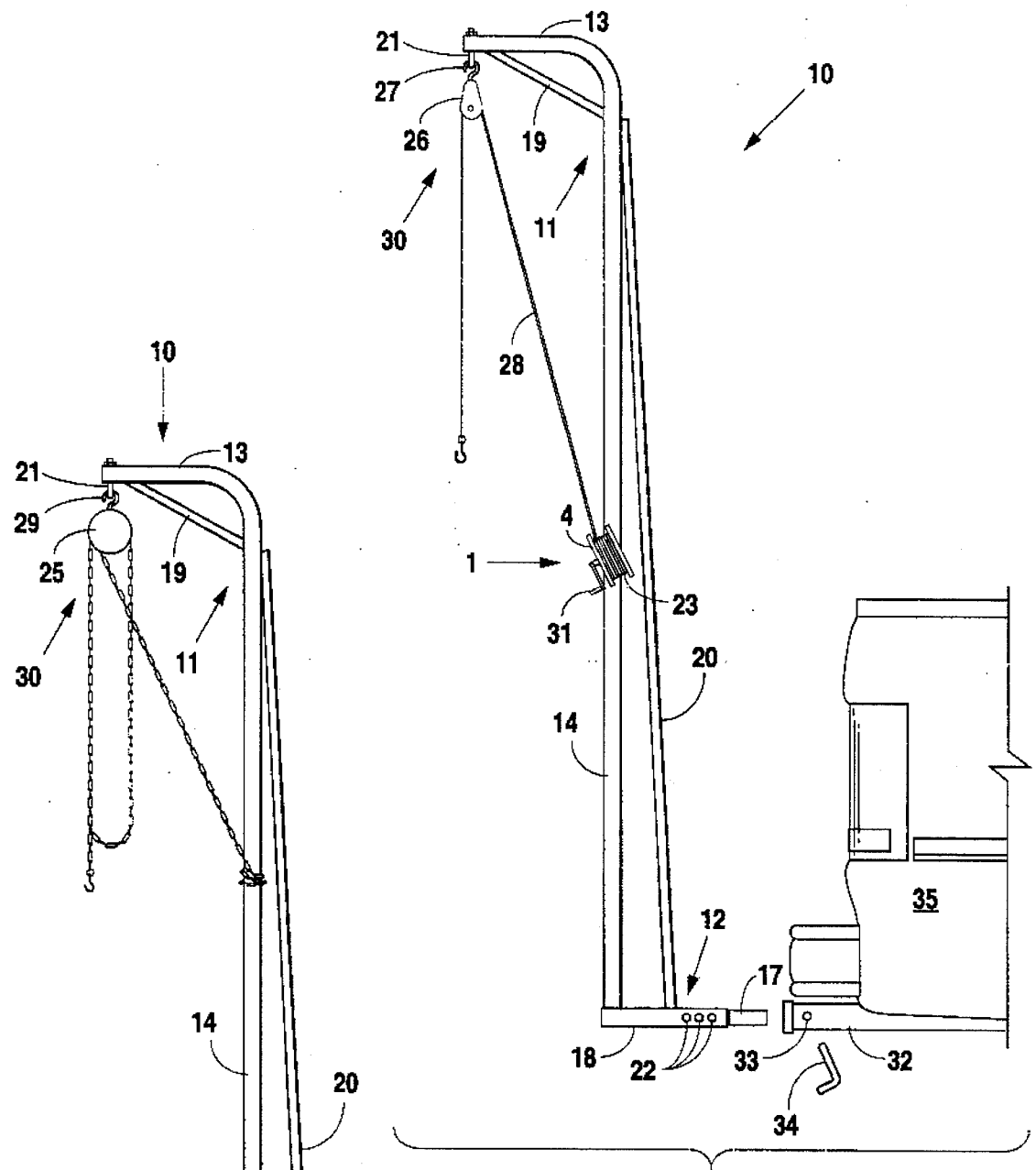
FIG. 1 is a side elevation view depicting the hoist of the present invention fitted with a winch.
Figure 2:
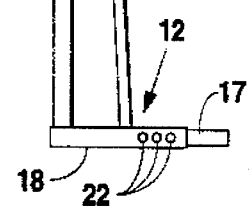
FIG. 2 is a side elevation view depicting the hoist of the present invention fitted with a block and tackle.

As illustrated in FIGS. 1 and 2, hoist 10 includes post 11 which connects to tongue 12 using any suitable means such as welding. Post 11 includes an angle to define boom 13 which extends from central column 14. Boom 13 includes eye 21 which connects to boom 13 using any suitable means such as welding.

Tongue 12 includes pivot member 17 which connects to securing member 18 using any suitable means such as welding. Securing member 18 includes holes 22 which permit the fastening of securing member 18 to a trailer hitch drawbar. In this preferred embodiment, pivot member 17 is of substantially cylindrical shape and securing member 18 is of substantially rectangular shape.

Brace 19 connects between boom 13 and central column 14 using any suitable means such as welding to provide support for boom 13. Similarly, brace 20 connects between central column 14 and securing member 18 using any suitable means such as welding to support central column 14.

Hoist 10 includes any suitable means for lifting objects such as winch 23 depicted in FIG. 1 or block and tackle 25 depicted in FIG. 2. Winch 23 is of conventional design and includes handle 31 and a winch support (not shown) which mounts to central column 14 using any suitable means such as welding. To utilize winch 23, pulley 26 is suspended from eye 21 using hook 27. Winch 23 includes cable 28 which winds about pulley 26 to provide an attachment means for the lifting of objects employing winch 23.

Alternatively, block and tackle 25 includes hook 29 which fits within eye 21 to suspend block and tackle 25 from boom 13. Block and tackle 25 comprises any conventional block and tackle and includes chains 30 which function as an attachment means for the lifting of objects employing block and tackle 25.

Although winch 23 and block and tackle 25 have been described separately, one skilled in the art will recognize that hoist 25 may include both. That is, winch 23 may be permanently attached to central column 14 and block and tackle 25 provided as an alternate lifting device. Thus, the interchanging of winch 23 and block and tackle 25 may be easily accomplished by successive removals and replacements of pulley 26 and block and tackle 25 to boom 13 through their connections to eye 21 via hooks 27 and 29, respectively.

Tongue 12 includes pivot member 17 to permit the easy connection of hoist 10 to trailer hitch drawbar 32 of vehicle 35. To connect hoist 10 to trailer hitch drawbar 32, hoist 10 is first laid flat on the ground. Second, tongue 12 is picked up and pivot member 17 inserted into trailer hitch drawbar 32. Third, once pivot member 17 resides within trailer hitch drawbar 32, post 11 is picked up and rotated to an upright position. Post 11 may be easily picked up because pivot member 17 supports the weight of hoist 10 within trailer hitch drawbar 32. Furthermore, the substantially cylindrical shape of pivot member 17 allows the easy rotation of post 11 to an upright position. Fourth, after the elevation of post 11 to an upright position, securing member 18 is inserted within trailer hitch drawbar 32 until one of holes 22 is aligned with hole 33. Finally, after one of holes 22 and hole 33 are aligned, pin 34 is inserted therethrough to secure hoist 10 within trailer hitch drawbar 32. At this point, either winch 23 or block and tackle 25 may be used to lift an object so that vehicle 35 may transport it. Accordingly, hoist 10 improves over previous trailer hitch drawbar mounted hoists because pivot member 17 permits the installation of hoist 10 without the typical strenuous exertion required with hoists having only square tongues.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

I claim:

1. A hoist capable of connection to a trailer hitch drawbar of a vehicle, comprising:

a post;

means for lifting connected to said post; and a tongue connected to said post for facilitating a rotation of said hoist from a substantially horizontal position to a substantially vertical position and for supporting said hoist in an installed position, said tongue comprising a pivot member connected to a securing member wherein, when inserted within the trailer hitch drawbar, said pivot member permits pivoting of said hoist from the substantially horizontal position to the substantially vertical position and further wherein, when inserted within the trailer hitch drawbar, said securing member supports said hoist in the installed position.

2. The hoist according to claim 1 wherein said pivot member has a substantially cylindrical shape.

3. The hoist according to claim 1 wherein said securing member has a substantially rectangular shape.

4. The hoist according to claim 1 wherein said means for lifting comprises a winch.

5. The host according to claim 1 wherein said means for lifting comprises a block and tackle.

6. The hoist according to claim 1 wherein said post is angled to form a boom extending from a central column.

7. The hoist according to claim 6 wherein said boom includes an eye which aids in the support of said means for lifting.

8. The hoist according to claim 6 further comprising a brace connected between said boom and said central column.

9. The hoist according to claim 6 further comprising a brace connected between said central column and said securing member.

* * * * *